United States Patent [19]
Gestkoff

[11] 4,121,701
[45] Oct. 24, 1978

[54] ADJUSTING ASSEMBLY FOR A DRUM BRAKE

[75] Inventor: Nicolas Gestkoff, Asnieres, France

[73] Assignee: Societe Anonyme D.B.A., Paris, France

[21] Appl. No.: 811,518

[22] Filed: Jun. 30, 1977

[51] Int. Cl.² .............................................. F16D 65/54
[52] U.S. Cl. .......................... 188/79.5 GE; 74/577 M; 188/79.5 GT; 188/196 B
[58] Field of Search ................... 188/79.5 R, 79.5 GC, 188/79.5 GE, 79.5 GT, 79.5 M, 79.5 P, 196 B; 192/111 A, 46; 74/533, 534, 540, 541, 577 R, 577 M

[56] References Cited

U.S. PATENT DOCUMENTS

| | | | |
|---|---|---|---|
| 3,032,143 | 5/1962 | Burnett | 188/79.5 GT |
| 3,400,787 | 9/1968 | Keller et al. | 188/79.5 GT |
| 3,998,297 | 12/1976 | Aono | 188/79.5 GT |

FOREIGN PATENT DOCUMENTS

| | | | |
|---|---|---|---|
| 1,168,179 | 4/1964 | Fed. Rep. of Germany | 188/79.5 M |

*Primary Examiner*—Edward R. Kazenske
*Attorney, Agent, or Firm*—Paul David Schoenle; Ken C. Decker

[57] ABSTRACT

A drum brake which comprises two brake shoes, an actuator situated between two first adjacent ends of the shoes and a fixed fulcrum block situated between the other two ends of the shoes. An adjuster is designed to increase the distance between the first ends of the shoes automatically as a function of the wear on the lining of the shoes. The adjuster comprises a lever pivoted at one end on a first of the shoes in the vicinity of the actuator. A pawl is pivoted on the first shoe and biased by a resilient member into engagement with a toothed sector formed on the other end of the lever. An operating member is responsive to an increase in the distance between the first ends of the shoes, so as to pivot the lever in the direction corresponding to adjustment of the brake. The resilient member comprises a spring of which at least part cooperates with the surface of the lever remote from the first shoe irrespective of the position of the adjuster.

2 Claims, 1 Drawing Figure

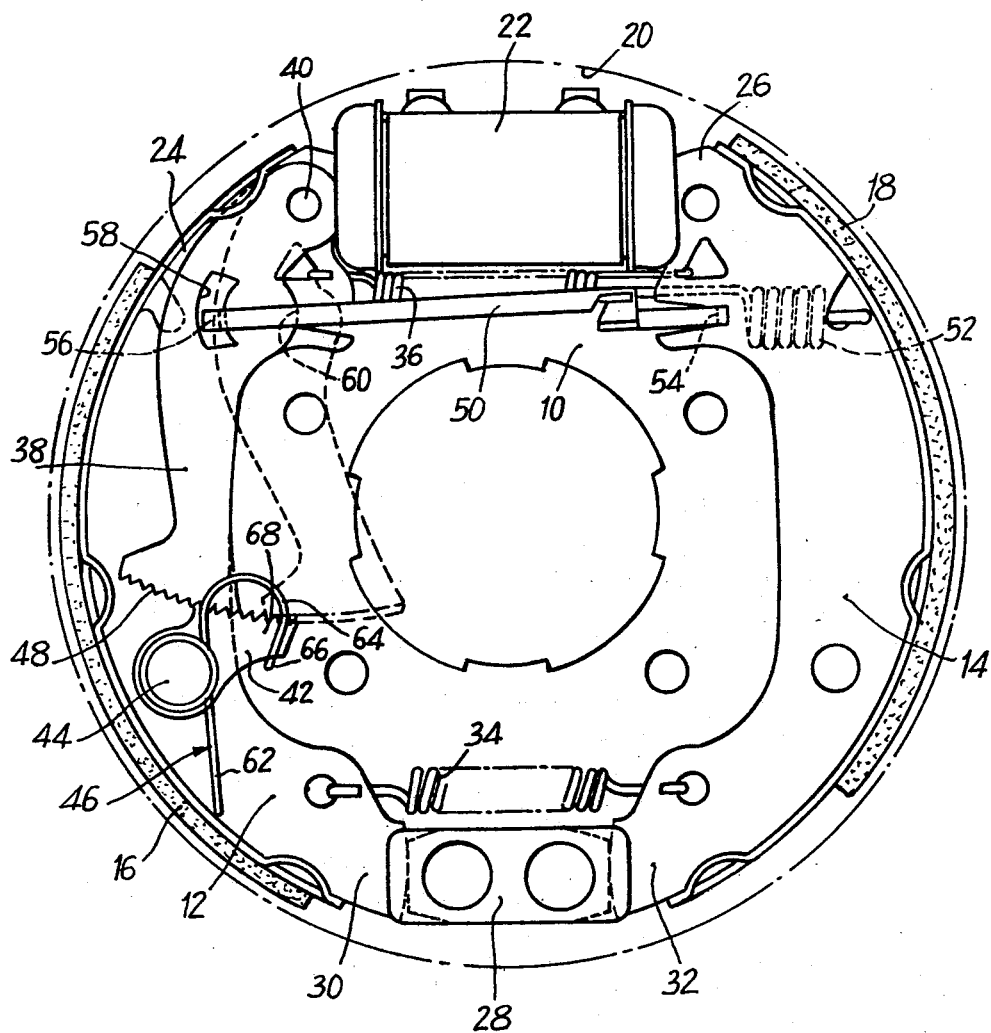

ADJUSTING ASSEMBLY FOR A DRUM BRAKE

The invention relates to a drum brake comprising automatic adjusting means for automatically taking up the wear on the linings of the shoes.

More particularly, the invention relates to a drum brake of the type comprising two brake shoes, actuating means situated between two first adjacent ends of the shoes, a fixed fulcrum block situated between the other two ends of the shoes, and adjusting means designed to increase the distance between the first ends of the shoes automatically as a function of the wear on the linings of the shoes, the adjusting means comprising a lever pivoted at one end on a first of said shoes in the vicinity of the actuating means, a pawl pivoted on said first shoe and biased by resilient means into engagement with a toothed sector formed on the other end of the lever, and an operating member which is responsive to an increase in said distance between the first ends of the shoes so as to pivot the lever in the direction corresponding to adjustment of the brake.

Drum brakes with adjusting means of this type generally operate satisfactorily and fulfil the principal requirements of drum brakes with automatic adjusting means. However, the design has the disadvantage that slight relative motion of the lever and pawl along the axis of the brake drum is liable to disengage the pawl from the toothed sector formed on the lever end, so that the adjusting means become ineffective. This possibility is usually anticipated by inserting an additional component of relatively complex shape, for example at the pivot for the adjusting lever.

An object of the invention is to overcome this disadvantage without adding new components which may increase the cost of the brake.

According to the invention, a drum brake of the type defined above is characterized in that the resilient means comprise a spring of which at least part cooperates with that surface of the lever remote from the first shoe irrespective of the position of the adjusting means.

The free end of the lever is therefore held axially in a simple manner because its two opposite surfaces cooperate respectively with the shoe on which the lever is mounted and with the spring biasing the pawl into engagement with the toothed sector on the lever end.

A particular embodiment of the invention will now be described by way of example with reference to the accompanying drawing, in which the single FIGURE represents a general view of a drum brake embodying the invention.

The drum brake illustrated in the drawing has a fixed support plate 10 designed to be mounted on a fixed element on the vehicle. Two brake shoes 12, 14 are slidable on the plate 10, and each bears a friction lining 16, 18 respectively. The linings 16, 18 can engage the drum which is associated with a rotary element of the vehicle, and of which the inside surface 20 is represented by a chain-line in the FIGURE. Actuating means 22, for example a hydraulic wheel cylinder in this embodiment, are provided between two adjoinings ends 24, 26 of the shoes 12, 14 respectively. The wheel cylinder 22 is adapted to be connected to a suitable source of fluid pressure, for example the master cylinder on the vehicle (not shown). A fulcrum block 28 associated with the fixed support plate 10 is provided between the other two adjoining ends 30, 32 of the respective shoes 12, 14.

Respective springs 34, 36 urge the ends 30, 32 on to the fulcrum block 28 and the ends 24, 26 on to the wheel cylinder 22.

Automatic adjusting means are provided to take up the wear on the linings 16, 18 by increasing the distance between the ends 24, 26 of the respective shoes 12, 14 when the brake is idle. The adjusting means comprise a lever 38, of which one end is pivoted by means of a pin 40 on the end 24 of the shoe 12, a pawl 42 pivoted on a pin 44 near the free end of the lever 38, a hairpin spring 46 biaising the pawl 42 into engagement with a toothed sector 48 formed on the free end of the lever 38, and an operating member formed by a rod 50 placed near the wheel cylinder 22 between the shoes 12, 14. The rod 50 is biased by a spring 52 into a notch 54 in the end 26 of the shoe 14, and a projection 56 on the other end of the rod extends with play into a hole 58 in the lever 38. The shoe 12 and lever 38 are biased by the spring 36 on to the end of a slot 60 in the rod 50. By means of this arrangement and in a known manner, operation of the wheel cylinder 22 causes the rod 50 to turn the lever 38 counterclockwise round its pin 40 when the projection 56 contacts the inner edge of the hole 58, that is, when the wear on the linings exceeds a value predetermined by the play between the projection 56 and the hole 58. The pawl 42 permits the lever 38 to rotate in this way and then pivots, counteracting the spring 46, and skips one tooth on the toothed sector 48 on the end of the lever 38, whereas when the lever 38 is urged clockwise by the rod 50 under the influence of the spring 36 when the brake is released, the cooperation between the pawl 42 and toothed sector 48 prevents such rotation of the lever 38.

Drum brake with adjusting means of this type are in current production and operate satisfactorily. However, they demand means for preventing the end of the lever 38 bearing the toothed sector 48 from moving axially away from the shoe 12 to extent that the pawl 42 disengages when the vehicle on which the brakes are mounted is travelling over particularly rough roads. In effect, under the influence of the spring 46, the pawl 42 might then insinuate itself between the free end of the lever 38 and the web of the shoe 12, so that the adjusting means do not operate. To overcome this disadvantage without making expensive modifications to brakes of this type, the invention proposes that the spring 46 should be specially shaped so that at least part of the spring cooperates with those surfaces of the lever 38 and pawl 42 which are remote from the shoe 12, irrespective of the position occupied by the adjusting means. In the embodiment illustrated, the spring 46 is a wire spring wound with at least one turn round the pivot 44 for the pawl 42, and it has a first arm 62 and a second arm 64. The first arm 62 is straight and runs substantially at a tangent to the pivot 44, with its end bearing on the flange of the shoe 12. The second arm 64 of the spring 46 substantially forms an extension of the first arm 62, but curves away from the said turn so that its end 66 bears on a projection 68 formed on the pawl 42. The second arm 64 approximately forms a semicircle extended at each end by a substantially straight portion. The straight portions of the arm 64 bear on that surface of the pawl 42 remote from the web of the shoe 12 and the curved part of the arm 64 bears on that surface of the lever 38 remote from the web of the shoe 12 irrespective of the position of the lever 38, as is shown by the FIGURE, in which solid lines show the lever 38 in the position occupied by it when the linings 16, 18 are new and broken lines show the position occupied by it when the linings are worn.

The brake just described operates as follows:

When idle, the various components of the brake occupy the positions shown by solid lines in the FIGURE. On operation of the wheel cylinder 22, the ends 24, 26 of the shoes 12, 14 respectively are urged apart until the linings 16, 18 make frictional contact with the inside surface 20 of the drum thereby providing a brake application. During this movement, and under the influence of the spring 52, the rod 50 follows the movement of the end 26 of the shoe 14, so that the projection 56 moves relative to the hole 58 in the lever 38. When the predetermined play between the projection 56 and hole 58 is taken up, that is, when the brake needs to be adjusted the projection 56 engages the inner edge of the hole 58 and so urges the lever 38 counterclockwise round its pivot 40. This movement pivots the pawl 42 clockwise against the spring 46, so that the pawl 42 skips one tooth in the toothed sector 48 on the end of the lever 38. The lever 38 is then in a different position relative to the shoe 12, and the distance between the ends 24, 26 of the respective shoes 12, 14 in the idle position is slightly increased. When the linings 16, 18 are worn right down, the lever 38 occupies the position shown by broken lines in the FIGURE, which illustrates clearly how the arm 64 of the spring 46 cooperates with that surface of the lever 38 remote from the web of the shoe 12 irrespective of the position of the lever 38, so that it holds the lever end carrying the toothed sector 48 axially and thus prevents the toothed sector 48 from escaping from the pawl 42.

What I claim is:

1. In a drum brake having a pair of brake shoes which are engageable with actuating means situated between adjacent ends of the pair of brake shoes, and an adjusting means comprising a lever pivotally mounted on one of said pair of brake shoes, a pawl pivotally mounted on the one brake shoe and engageable with the lever, an operating member cooperating with the lever to provide for rotation of the lever upon movement of the pair of brake shoes and a spring biasing the pawl into engagement with the lever, the improvement wherein said spring includes a first arm engaging the one brake shoe and a second arm, said second arm substantially forming a semicircle engageable with said pawl and said lever at the engagement therebetween to retain said pawl in alignment with said lever, said semicircle terminating in an end which is engageable with said pawl to bias the latter into engagement with said lever.

2. The drum brake of claim 1 in which said semicircle provides two portions which are engageable with said pawl and said lever at the engagement therebetween to maintain the alignment between said pawl and said lever.

* * * * *